(12) United States Patent
Gardner et al.

(10) Patent No.: US 12,115,790 B2
(45) Date of Patent: Oct. 15, 2024

(54) INTEGRATED CIRCUITS INCLUDING STRAIN GAUGE SENSORS

(71) Applicant: HEWLETT-PACKARD DEVELOPMENT COMPANY, L.P., Spring, TX (US)

(72) Inventors: James Michael Gardner, Corvallis, OR (US); Scott A. Linn, Corvallis, OR (US); John Rossi, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 208 days.

(21) Appl. No.: 17/419,606

(22) PCT Filed: May 15, 2019

(86) PCT No.: PCT/US2019/032453
§ 371 (c)(1),
(2) Date: Jun. 29, 2021

(87) PCT Pub. No.: WO2020/231423
PCT Pub. Date: Nov. 19, 2020

(65) Prior Publication Data
US 2022/0080735 A1  Mar. 17, 2022

(51) Int. Cl.
*B41J 2/165* (2006.01)
*B41J 2/045* (2006.01)
*G01L 1/18* (2006.01)
*G01L 1/26* (2006.01)

(52) U.S. Cl.
CPC ......... *B41J 2/16517* (2013.01); *B41J 2/0451* (2013.01); *B41J 2/04513* (2013.01); *B41J 2/04563* (2013.01); *B41J 2/16535* (2013.01); *G01L 1/18* (2013.01); *G01L 1/26* (2013.01)

(58) Field of Classification Search
CPC .. B41J 2/0451; B41J 2/04513; B41J 2/04563; B41J 2/16517; B41J 2/16535; G01L 1/18; G01L 1/26
See application file for complete search history.

(56) References Cited

U.S. PATENT DOCUMENTS

| | | | |
|---|---|---|---|
| 6,540,316 B1 | 4/2003 | Imanaka | |
| 6,739,199 B1 | 5/2004 | Nikkel | |
| 8,298,293 B2 * | 10/2012 | Leydet | A61F 2/70 623/24 |
| 8,789,932 B2 | 7/2014 | Van et al. | |
| 8,888,226 B1 | 11/2014 | Gardner | |
| 9,097,565 B2 | 8/2015 | Beaumont et al. | |
| 10,107,697 B2 | 10/2018 | Pollard et al. | |

(Continued)

FOREIGN PATENT DOCUMENTS

| | | |
|---|---|---|
| CN | 107528577 A | 12/2017 |
| CN | 108312496 A | 7/2018 |

(Continued)

*Primary Examiner* — Geoffrey S Mruk
(74) *Attorney, Agent, or Firm* — Foley & Lardner LLP

(57) ABSTRACT

An integrated circuit to drive a plurality of fluid actuation devices includes a strain gauge sensor, an amplifier, and a voltage bias generator. The strain gauge sensor generates a strain gauge signal. The amplifier amplifies the strain gauge signal. The voltage bias generator offsets the amplified strain gauge signal.

15 Claims, 7 Drawing Sheets

(56) References Cited

U.S. PATENT DOCUMENTS

| | | |
|---|---|---|
| 11,090,942 B2 * | 8/2021 | Gardner ............... B41J 2/16517 |
| 2002/0050172 A1 | 5/2002 | Toyoda |
| 2006/0125870 A1 | 6/2006 | Lee |
| 2016/0009082 A1 | 1/2016 | Chen |
| 2016/0243825 A1 | 8/2016 | Kamiyanagi |
| 2017/0355185 A1 | 12/2017 | Anderson |
| 2018/0001531 A1 | 1/2018 | Lawless, III et al. |
| 2019/0063967 A1 | 2/2019 | Smith et al. |
| 2019/0078953 A1 | 3/2019 | Huo et al. |

FOREIGN PATENT DOCUMENTS

| | | |
|---|---|---|
| CN | 109506826 A | 3/2019 |
| WO | WO-2010017970 A2 | 2/2010 |
| WO | WO-2010089234 A1 | 8/2010 |
| WO | WO-2017077594 A1 | 8/2018 |
| WO | WO-2018199886 A1 | 11/2018 |
| WO | WO-2018199888 A1 | 11/2018 |
| WO | WO-2018199895 A1 | 11/2018 |
| WO | WO-2019017907 A1 | 1/2019 |

* cited by examiner

INTEGRATED CIRCUITS INCLUDING STRAIN GAUGE SENSORS

CROSS-REFERENCE TO RELATED APPLICATIONS

This application is a U.S. National Stage Application of PCT Application No. PCT/US19/32453, filed May 15, 2019, entitled "INTEGRATED CIRCUITS INCLUDING STRAIN GAUGE SENSORS".

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

Figure 1A:
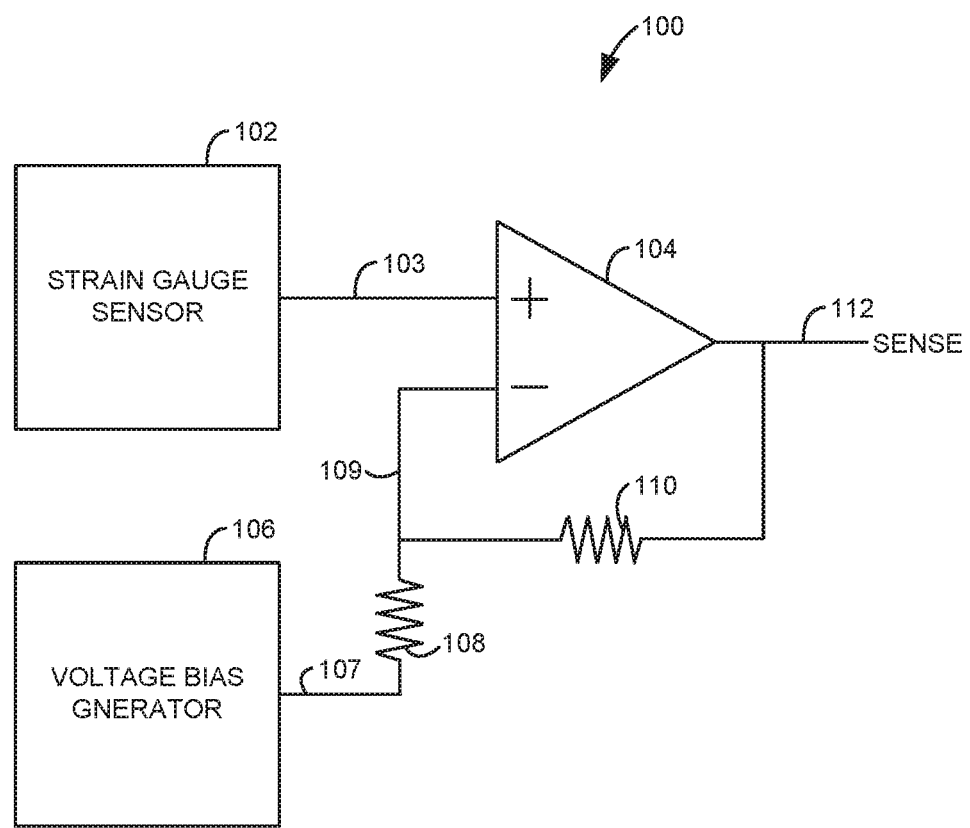
FIG. 1A illustrates one example of an integrated circuit to drive a plurality of fluid actuation devices.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Printheads, as one example of a fluid ejection device, may be serviced by a service station assembly within an inkjet printing system to maintain nozzle health and extend the life of the printheads. Some inks used in inkjet printing systems may be difficult to jet and may suffer from puddling, crusting, and/or decap. Accordingly, one type of printhead servicing includes periodically wiping the printheads to remove the excess ink from the printheads. Optimal nozzle servicing is critical to provide the highest print quality and minimal customer interruptions. Therefore, it would be advantageous to be able to determine the force applied to the printhead due to servicing. Pressures that are too high may damage the printhead while pressures that are too low may ineffectively service the printhead.

In addition, it would be advantageous to be able to detect and react to a printhead impact to the print medium or other object before further damage occurs. Being able to detect the severity of impacts to determine whether a printhead change is necessary would also be useful. Some printhead to print medium impacts result in contact to the printhead surface that smear print results but do not completely halt the medium. In these cases, if a portion of the medium (e.g., corrugate packaging) is torn and drags across the printhead, the printhead may be damaged if the printhead is not stopped immediately. The print job may also need to be discarded if the printhead is not stopped immediately. Printhead impacts and the defective print jobs resulting therefrom often go undetected until print quality audits are completed, resulting in large waste to the customer. Latent detection of printhead impacts may also result in permanent damage to the printhead.

Measurement capability may not exist in production printheads that provides insight as to the strain experienced by the printhead throughout the life of the printhead. The primary indicator that strain levels have exceeded safe limits is a cracked die. This results in downtime for customers, lost print jobs, and a reactive response to something that may have been easily detectable and avoided. Accordingly, it would be advantageous to be able to detect and react to impending printhead failure before the failure actually happens. Further, it would be advantageous to be able to detect when a fluid ejection system is exhibiting significant vibration, which may either indicate damaged components or an otherwise hostile operating environment.

Accordingly, disclosed herein are integrated circuits (e.g., fluid ejection dies) including one (i.e., a single) strain gauge sensor or a plurality of strain gauge sensors integrated within the integrated circuit. The strain gauge sensors may sense a strain response of the integrated circuit during servicing of the fluid ejection die to calibrate a servicing station or stop servicing based on the sensed strain response. The strain gauge sensors may sense a strain response during operation of the fluid ejection system to detect impacts or vibration of the integrated circuit based on the sensed strain response. The strain gauge sensors may sense a strain response over time to detect whether the integrated circuit is close to failure based on the sensed strain response. Operation of a fluid ejection system may be stopped or a user of the fluid ejection system may be alerted based on the sensed strain response.

As used herein a "logic high" signal is a logic "1" or "on" signal or a signal having a voltage about equal to the logic power supplied to an integrated circuit (e.g., between about 1.8 V and 15 V, such as 5.6 V). As used herein a "logic low" signal is a logic "0" or "off" signal or a signal having a voltage about equal to a logic power ground return for the logic power supplied to the integrated circuit (e.g., about 0 V).

FIG. 1A illustrates one example of an integrated circuit 100 to drive a plurality of fluid actuation devices. Integrated circuit 100 includes a strain gauge sensor 102, an amplifier 104, a voltage bias generator 106, resistors 108 and 110, and a single interface (e.g., sense interface) 112. An output of strain gauge sensor 102 is electrically coupled to the non-inverting input of amplifier 104 through a signal path 103. An output of voltage bias generator 106 is electrically coupled to one side of resistor 108 through a signal path 107. The other side of resistor 108 is electrically coupled to the inverting input of amplifier 104 and one side of resistor 110 through a signal path 109. The other side of resistor 110 and the output of amplifier 104 are electrically coupled to interface 112.

Strain gauge sensor 102 generates a strain gauge signal and outputs the strain gauge signal to signal path 103. In one example, strain gauge sensor 102 may include a piezoresistive sensor element that exhibits a change in resistance in response to stress in one axis. In other examples, strain gauge sensor 102 may include multiple piezoresistive sensor elements that exhibits a change in resistance in response to stress in multiple axes, respectively. The sensor elements, for example, may be arranged in a wheatstone bridge configuration to form a wheatstone strain gauge sensor or in a half wheatstone bridge configuration to form a half wheatstone strain gauge sensor.

Amplifier 104 amplifies the strain gauge signal on signal path 103. The gain of amplifier 104 may be set by selecting the resistances of resistors 108 and 110. In one example, the resistances of resistors 108 and 110 are fixed, such that the gain of amplifier 104 is fixed. In other examples, resistor 108 and/or 110 may be variable resistors, such that the gain of amplifier 104 may be adjusted based on a control signal(s) applied to resistor 108 and/or 110. In another example, for a wheatstone strain gauge sensor, a differential to single ended amplifier may be arranged between strain gauge sensor 102 and amplifier 104. The differential amplifier may also have a fixed gain or a configurable gain.

Voltage bias generator 106 offsets the amplified strain gauge signal. Voltage bias generator 106 outputs a bias voltage on signal path 107 to raise or lower the voltage level of the amplified strain gauge signal. In one example, voltage bias generator 106 and/or amplifier 104 are calibrated such that the offset and amplified strain gauge signal output to interface 112 is within a desired range capable of being measured by an external device, such as a fluid ejection system 600 to be described below with reference to FIG. 6.

Single interface 112 outputs the offset and amplified strain gauge signal. In one example, single interface 112 includes a contact pad, a pin, a bump, or a wire. The single interface 112 may contact a single printer-side contact (e.g., of a fluid ejection system) to transmit signals to and from the single printer-side contact.

Interface 112 may be susceptible to electrical noise. This noise may modify the strain gauge signal magnitude independent of the actual strain gauge sensor response, adding uncertainty to any measurement decisions. This noise may even cause false triggers in response to wiping events or impact detection methods. Thus, by using amplifier 104 near strain gauge sensor 102 for single-ended amplification, a clean strain gauge signal can be amplified, effectively reducing the impact of downstream noise sources. For example, if a 1 mV stain strain gauge signal and 1 mV of noise are present on interface 112, the signal of interest is indiscernible. However, if 10x gain is applied by amplifier 104, the strain gauge signal on interface 112 becomes 10 mV compared to the still 1 mV of noise, and the strain response remains observable. Amplifier 104 may also serve as a low impedance output driver for what would otherwise be a high impedance output (high impedance outputs are more susceptible to noise contamination). In addition, amplifier 104 may also be designed with a suitable bandwidth to either filter or pass strain gauge signals in a desired frequency range.

Integrated circuit 100 may be fabricated on silicon and be overmolded. The manufacturing process may induce a large strain signal in the silicon, resulting in a large signal offset from strain gauge sensor 102. To nullify this large stain offset, and satisfy the input and output range requirements of the signal conditioning path, offset calibration (i.e., tuning) may be used. Thus, the offset calibration voltage (i.e., bias voltage) is generated by voltage bias generator 106 and fed into the amplifier 104 feedback path to tune the output voltage during a null state of the integrated circuit 100. Once calibrated to a desired output threshold, a wiping or impact detection event may be measured with signal gain applied. Calibration ensures that the output signal on interface 112 is both in range of the fluid ejection system input requirements and has a sufficiently high signal to noise ratio (SNR).

Figure 1B:
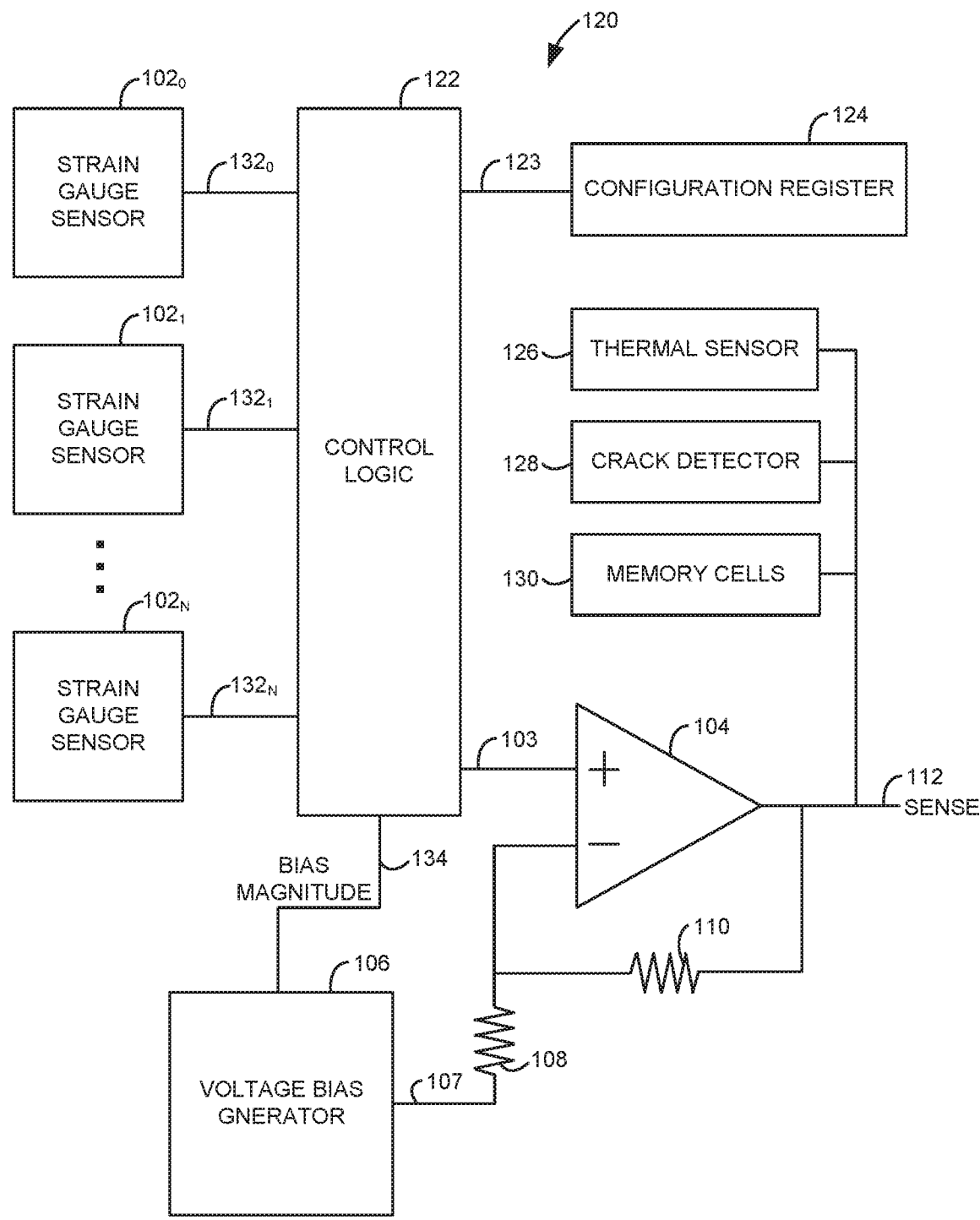
FIG. 1B illustrates another example of an integrated circuit to drive a plurality of fluid actuation devices.

FIG. 1B illustrates another example of an integrated circuit 120 to drive a plurality of fluid actuation devices. Integrated circuit 120 includes a plurality of strain gauge sensors $102_0$ to $102_N$, where "N" is any suitable number of strain gauge sensors. Integrated circuit 120 includes an amplifier 104, a voltage bias generator 106, resistors 108 and 110, and a single interface (e.g., sense interface) 112. In addition, integrated circuit 120 may include control logic 122, a configuration register 124, a thermal sensor 126, a crack detector 128, and memory cells 130. Control logic 122 is electrically coupled to each strain gauge sensor $102_0$ to $102_N$ through a signal path $132_0$ to $132_N$, respectively, to configuration register 124 through a signal path 123, to the non-inverting input of amplifier 104 through a signal path 103, and to voltage bias generator 106 through a bias magnitude signal path 134. Thermal sensor 126, crack detector 128, and memory cells 130 are electrically coupled to the single interface 112.

Control logic 122 selectively electrically couples each of the plurality of strain gauge sensors $102_0$ to $102_N$ to the amplifier 104. Control logic 122 may include transistor switches, a multiplexer, or other suitable logic circuitry for controlling the operation of integrated circuit 120. In one example, the configuration register 124 may store data to enable or disable each strain gauge sensor $102_0$ to $102_N$. Accordingly, control logic 122 may electrically couple a strain gauge sensor $102_0$ to $102_N$ to the amplifier 104 based on the data stored in configuration register 124. With a selected strain gauge sensor $102_0$ to $102_N$ electrically coupled to amplifier 104, the strain gauge signal from the selected strain gauge sensor is offset and amplified and output on interface 112 as previously described with reference to FIG. 1A.

Configuration register 124 may be a memory device (e.g., non-volatile memory, shift register, etc.) and may include any suitable number of bits (e.g., 4 bits to 24 bits, such as 12 bits). In certain examples, configuration register 124 may also store configuration data for testing integrated circuit 120, detecting cracks within a substrate of integrated circuit 120, enabling timers of integrated circuit 120, setting analog delays of integrated circuit 120, validating operations of integrated circuit 120, or for configuring other functions of integrated circuit 120.

Configuration register 124 may also store data to set a bias magnitude of the voltage bias generator 106. Accordingly, control logic 122 may provide a bias magnitude signal through bias magnitude signal path 134 to voltage bias generator 106 based on the data stored in configuration register 124. Voltage bias generator 106 outputs a bias voltage on signal path 107 based on the bias magnitude. Configuration register 124 may also store data to set a gain of the amplifier 104. Accordingly, control logic 122 may provide a control signal to resistor 108 and/or resistor 110 to adjust the gain of amplifier 104 based on the data stored in configuration register 124.

Thermal sensor 126 may include a thermal diode or another suitable thermal device. Thermal sensor 126 may provide a signal through interface 112 indicating a temperature of integrated circuit 120. Crack detector 128 may be a resistive wiring or another suitable device. Crack detector 128 may provide a signal through interface 112 indicating a crack state of integrated circuit 120. Memory cells 130 may be non-volatile memory cells for storing data about integrated circuit 120 and/or for storing data about a fluid ejection system to which integrated circuit 120 is connected. Memory cells 130 may be accessed for read and/or write operations through interface 112. In one example, control logic 122 may enable or disable thermal sensor 126, crack detector 128, and/or access to memory cells 130 based on data stored in configuration register 124. In another example, control logic 122 may enable or disable thermal sensor 126, crack detector 128, and/or access to memory cells 130 based on data received by integrated circuit 120 from an external device, such as a fluid ejection system.

Figure 2:
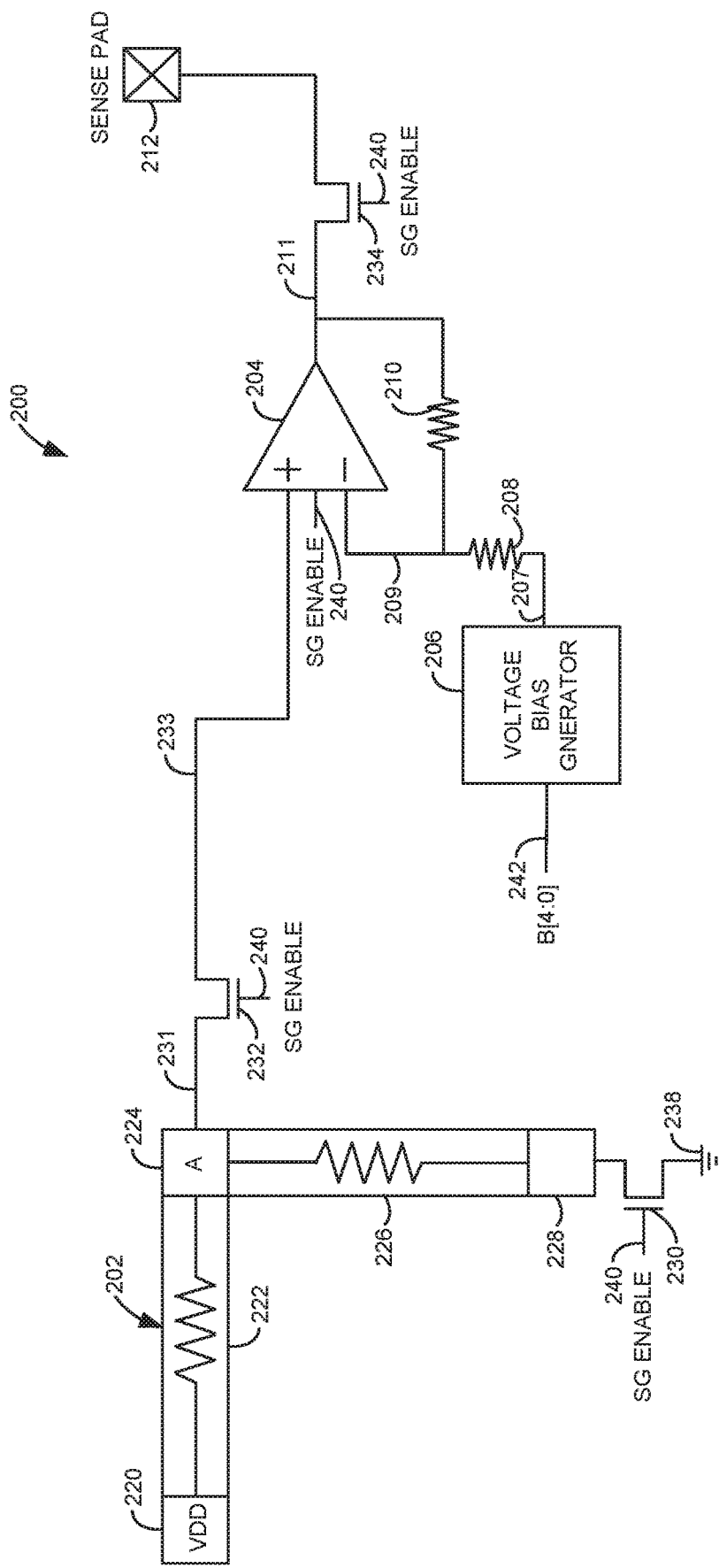
FIG. 2 is a schematic diagram illustrating one example of a circuit including a strain gauge sensor.

FIG. 2 is a schematic diagram illustrating one example of a circuit 200 including a strain gauge sensor. In one example, circuit 200 is part of integrated circuit 100 of FIG. 1A or integrated circuit 120 of FIG. 1B. Circuit 200 includes a strain gauge sensor 202, an amplifier 204, a voltage bias generator 206, resistors 208 and 210, transistors 230, 232, and 234, and a sense pad 212. Strain gauge sensor 202 includes a supply node (e.g., VDD), a first piezoresistive sensor element 222, a sensing (A) node 224, a second piezoresistive sensor element 226, and a node 228.

First piezoresistive sensor element 222 is electrically coupled between supply node 220 and sensing node 224. Second piezoresistive sensor element 226 is electrically coupled between sensing node 224 and node 228. Node 228 is electrically coupled to one side of the source-drain path of transistor 230. The gate of transistor 230 is electrically coupled to a strain gauge enable signal path 240. The other side of the source-drain path of transistor 230 is electrically coupled to a common or ground node 238.

Sensing node 224 is electrically coupled to one side of the source-drain path of transistor 232 through a signal path 231. The gate of transistor 232 is electrically coupled to signal path 240. The other side of the source-drain path of transistor 232 is electrically coupled to the non-inverting input of amplifier 204 through a signal path 233. An enable input of amplifier 204 is electrically coupled to strain gauge enable signal path 240.

An input of voltage bias generator 206 is electrically coupled to a bias magnitude (B[4:0]) signal path 242. The output of voltage bias generator 206 is electrically coupled to one side of resistor 208 through a signal path 207. The other side of resistor 208 is electrically coupled to one side of resistor 210 and the inverting input of amplifier 204 through a signal path 209. The output of amplifier 204 is electrically coupled to the other side of resistor 210 and one side of the source-drain path of transistor 234 through a signal path 211. The gate of transistor 234 is electrically coupled to strain gauge enable signal path 240. The other side of the source-drain path of transistor 234 is electrically coupled to sense pad 212.

While circuit 200 includes one strain gauge sensor 202 for generating a strain gauge signal, circuit 200 may include any suitable number of strain gauge sensors for generating strain gauge signals. Each strain gauge sensor may be enabled or disabled in a similar manner as described for strain gauge sensor 202. In addition, the strain gauge signal from each strain gauge sensor may be offset and amplified in a similar manner as described for strain gauge sensor 202.

Circuit 200 receives a strain gauge enable signal on strain gauge enable signal path 240 and a bias magnitude signal on bias magnitude signal path 242. In one example, the strain gauge enable signal and the bias magnitude signal may be based on data stored in a configuration register, such as configuration register 124 of FIG. 1B. In another example, the strain gauge enable signal and the bias magnitude signal may be based on data passed to circuit 200 from a fluid ejection system, such as fluid ejection system 600 of FIG. 6.

Voltage bias generator 206 outputs a bias voltage on signal path 207 based on the bias magnitude signal on signal path 242. In one example, the bias magnitude signal includes multiple (e.g., five) bits to set the bias voltage. The multiple bits indicating the bias magnitude may be stored in a configuration register, such as configuration register 124 of FIG. 1B.

In this example, strain gauge sensor 202 is a half wheatstone strain gauge sensor. In response to a logic high strain gauge enable signal, transistors 230, 232, and 234 are turned on (i.e., conducting) and amplifier 204 is enabled. With transistor 230 turned on, strain gauge sensor 202 is enabled by electrically connecting node 228 of strain gauge sensor 202 to the common or ground node 238. With transistor 232 turned on, the strain gauge signal on sensing node 224 is passed to the non-inverting input of amplifier 204. With transistor 234 turned on, the offset and amplified strain gauge signal on signal path 211 is passed to sense pad 212.

In response to a logic low strain gauge enable signal, transistors 230, 232, and 234 are turned off and amplifier 204 is disabled. With transistor 230 turned off, strain gauge sensor 202 is disabled by electrically disconnecting node 228 of strain gauge sensor 202 from the common or ground node 238. With transistor 232 turned off, any signal on signal path 231 is blocked from passing to the non-inverting input of amplifier 204. With transistor 234 turned off, any signal on signal path 211 is blocked from passing to sense pad 212. Accordingly, in response to a logic high strain gauge enable signal, the strain gauge signal at sensing node 224 is offset by voltage bias generator 206 and amplified by amplifier 204, and the offset and amplified strain gauge signal is output to sense pad 212. In response to a logic low strain gauge enable signal, strain gauge sensor 202 is disabled and no signal is output to sense pad 212 from amplifier 204.

Figure 3A:
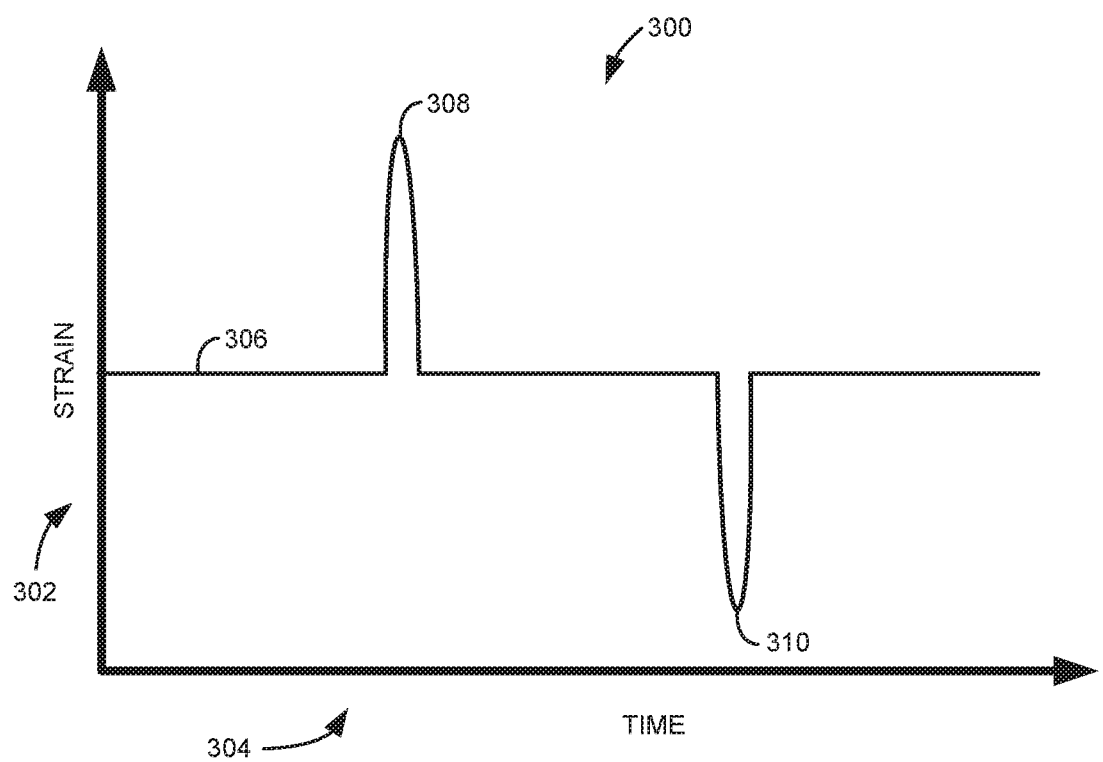
FIG. 3A is a chart illustrating one example of a strain response.

FIG. 3A is a chart illustrating one example of a strain response 300. The strain response may be output on an interface, such as sense interface 112 of FIGS. 1A and 1B or sense pad 212 of FIG. 2. The chart includes strain as indicated at 302 versus time as indicated at 304. A baseline strain is indicated at 306. The baseline strain may be calibrated by adjusting the bias magnitude of a voltage bias generator, such as voltage bias generator 206 of FIG. 2. Upon a wiping event applied along a first axis in which the fluid ejection die comes into contact with a rubber blade or wiper, the strain gauge sensor outputs a signal that rises to a peak value as indicated at 308 and then falls back to the baseline strain 306. Upon a wiping event applied along a second axis perpendicular to the first axis in which the fluid ejection die comes into contact with a rubber blade or wiper, the strain gauge sensor outputs a signal that falls to a minimum value as indicated at 310 and then rises back to the baseline strain 306. The peak value at 308 and/or the minimum value at 310 may be used to determine whether too much pressure, too little pressure, or sufficient pressure is being applied to the fluid ejection die during a wiping event.

Figure 3B:
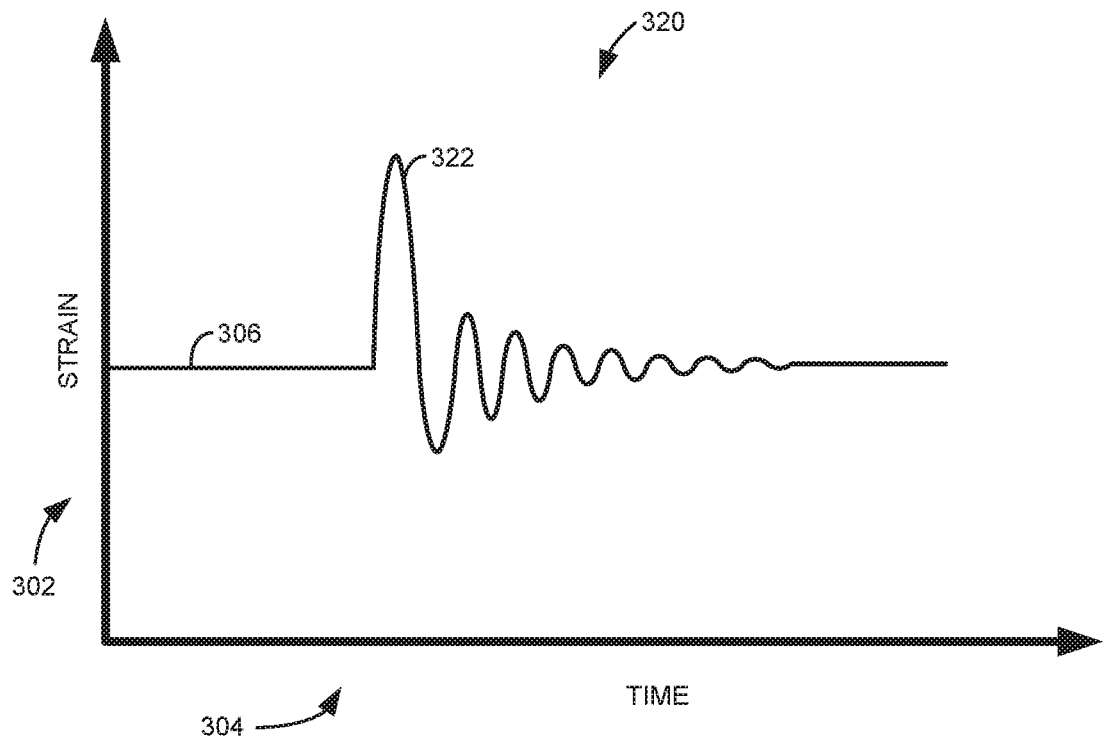
FIG. 3B is a chart illustrating another example of a strain response.

FIG. 3B is a chart illustrating another example of a strain response 320. The strain response may be output on an interface, such as sense interface 112 of FIGS. 1A and 1B or sense pad 212 of FIG. 2. The chart includes strain as indicated at 302 versus time as indicated at 304. A baseline strain is indicated at 306. When the fluid ejection die is subjected to vibrations (e.g., due to an impact), the strain gauge sensor outputs a signal that rapidly oscillates above and below the baseline strain 306 multiple times as indicated at 322 until the vibrations dissipate. The peak signal values and the length of time the vibrations persist may be used to determine the severity of the vibrations (or impact). The peak values and/or the length of time the vibrations persist may be compared to vibration thresholds to determine whether operation of the fluid ejection system should be stopped or whether the user of the fluid ejection system should be alerted. Additionally, the frequency content of the measured signal may be analyzed by the fluid ejection system to determine if action is required.

Figure 4A:
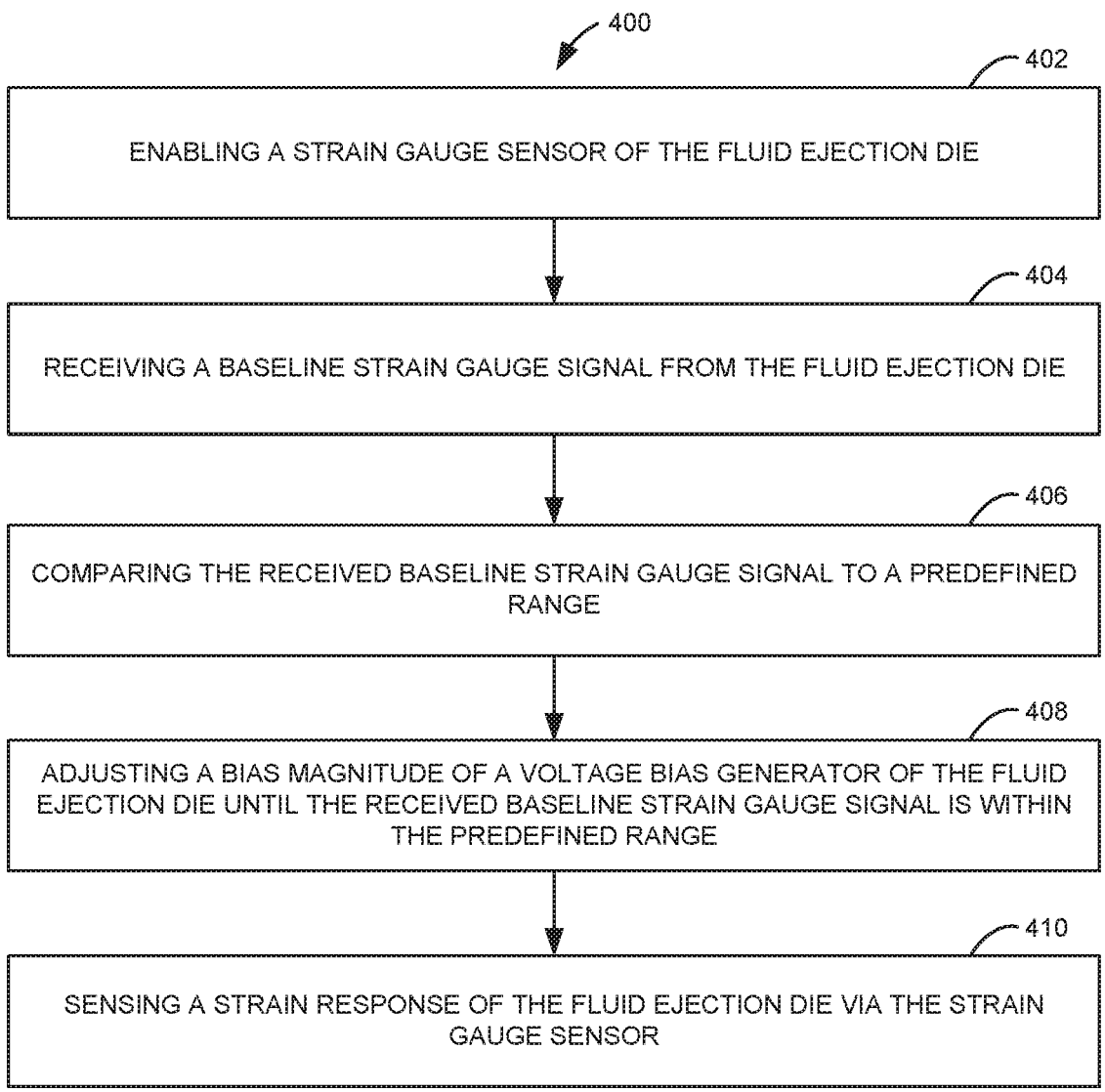
FIGS. 4A and 4B are flow diagrams illustrating examples of a method for sensing a strain response of a fluid ejection die.
Figure 4B:
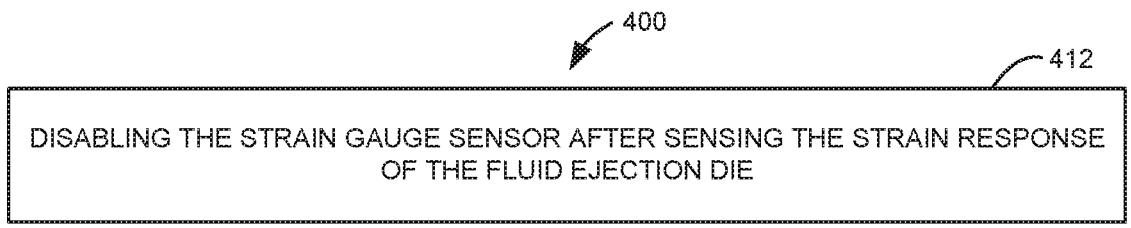

FIGS. 4A and 4B are flow diagrams illustrating examples of a method 400 for sensing a strain response of a fluid ejection die. In one example, method 400 may be implemented using integrated circuit 100 of FIG. 1A, integrated circuit 120 of FIG. 1B, or circuit 200 of FIG. 2. As illustrated in FIG. 4A at 402, method 400 includes enabling a strain gauge sensor of the fluid ejection die. In one example, enabling the strain gauge sensor includes writing a strain gauge enable bit to a configuration register of the fluid ejection die. At 404, method 400 includes receiving a baseline strain gauge signal from the fluid ejection die. At 406, method 400 includes comparing the received baseline strain gauge signal to a predefined range.

At 408, method 400 includes adjusting a bias magnitude of a voltage bias generator of the fluid ejection die until the received baseline strain gauge signal is within the predefined range. In one example, adjusting the bias magnitude of the voltage bias generator includes writing offset calibration bits to a configuration register of the fluid ejection die. At 410, method 400 includes sensing a strain response of the fluid ejection die via the strain gauge sensor. In one example, sensing the strain response of the fluid ejection die includes sensing the strain response of the fluid ejection die due to a wiping event or an impact event. As illustrated in FIG. 4B at 412, method 400 may further include disabling the strain gauge sensor after sensing the strain response of the fluid ejection die.

Figure 5A:
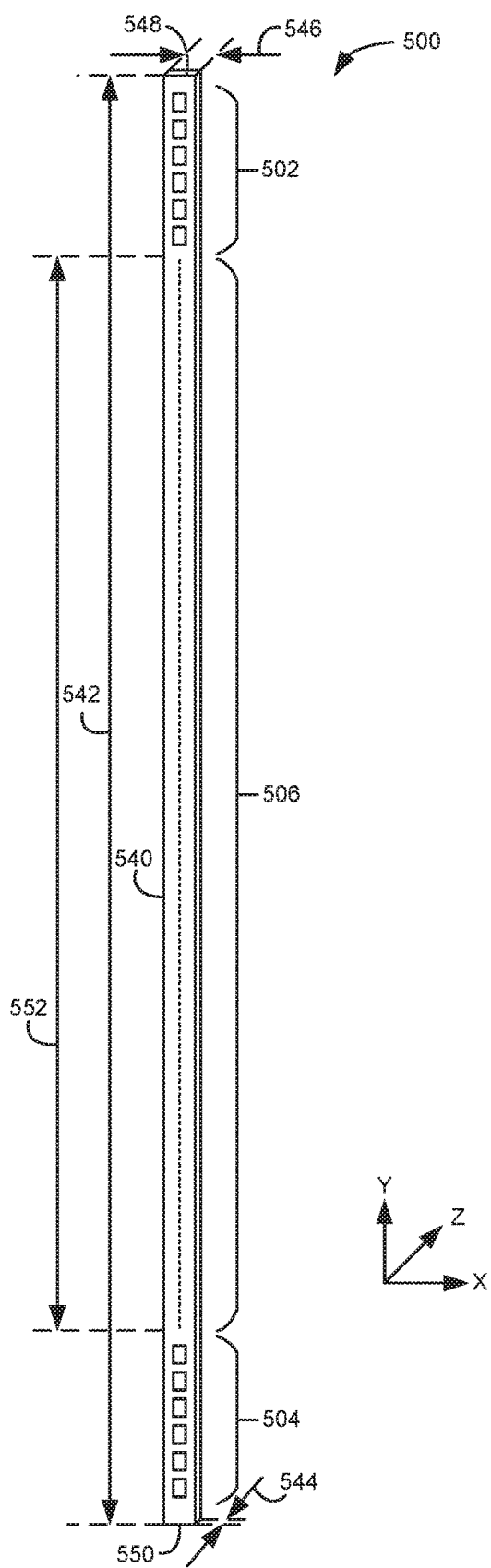
FIGS. 5A and 5B illustrate one example of a fluid ejection die.
Figure 5B:
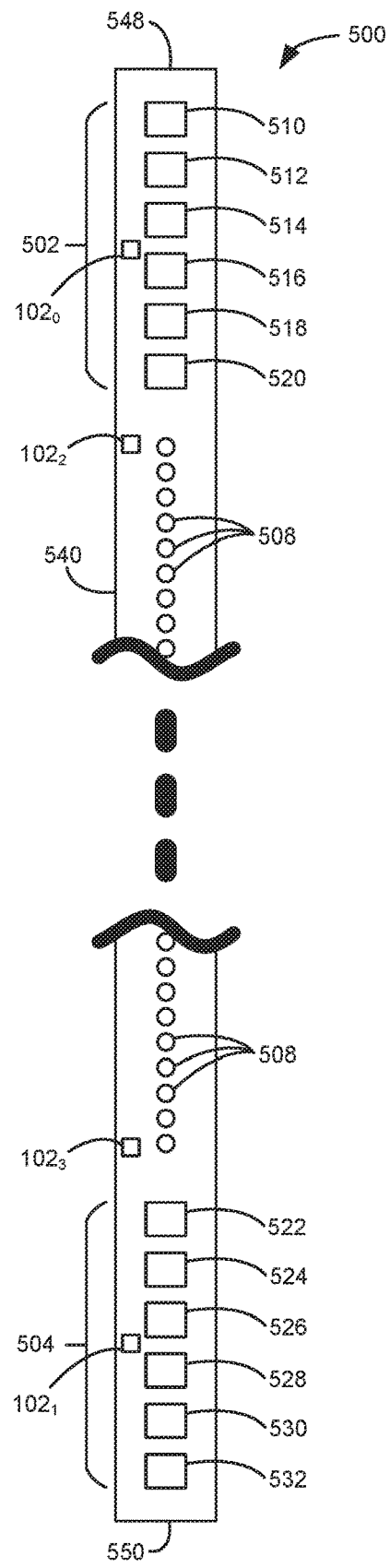

FIG. 5A illustrates one example of a fluid ejection die 500 and FIG. 5B illustrates an enlarged view of the ends of fluid ejection die 500. In one example, fluid ejection die 500 includes integrated circuit 100 of FIG. 1A, integrated circuit 120 of FIG. 1B, or circuit 200 of FIG. 2. Die 500 includes a first column 502 of contact pads, a second column 504 of contact pads, and a column 506 of fluid actuation devices 508.

The second column 504 of contact pads is aligned with the first column 502 of contact pads and at a distance (i.e., along the Y axis) from the first column 502 of contact pads. The column 506 of fluid actuation devices 508 is disposed longitudinally to the first column 502 of contact pads and the second column 504 of contact pads. The column 506 of fluid actuation devices 508 is also arranged between the first column 502 of contact pads and the second column 504 of contact pads. In one example, fluid actuation devices 508 are nozzles or fluidic pumps to eject fluid drops.

In one example, the first column 502 of contact pads includes six contact pads. The first column 502 of contact pads may include the following contact pads in order: a data contact pad 510, a clock contact pad 512, a logic power ground return contact pad 514, a multipurpose input/output contact (e.g., sense) pad 516, a first high voltage power supply contact pad 518, and a first high voltage power ground return contact pad 520. Therefore, the first column 502 of contact pads includes the data contact pad 510 at the top of the first column 502, the first high voltage power ground return contact pad 520 at the bottom of the first column 502, and the first high voltage power supply contact pad 518 directly above the first high voltage power ground return contact pad 520. While contact pads 510, 512, 514, 516, 518, and 520 are illustrated in a particular order, in other examples the contact pads may be arranged in a different order.

In one example, the second column 504 of contact pads includes six contact pads. The second column 504 of contact pads may include the following contact pads in order: a second high voltage power ground return contact pad 522, a second high voltage power supply contact pad 524, a logic reset contact pad 526, a logic power supply contact pad 528, a mode contact pad 530, and a fire contact pad 532. Therefore, the second column 504 of contact pads includes the second high voltage power ground return contact pad 522 at the top of the second column 504, the second high voltage power supply contact pad 524 directly below the second high voltage power ground return contact pad 522, and the fire contact pad 532 at the bottom of the second column 504. While contact pads 522, 524, 526, 528, 530, and 532 are illustrated in a particular order, in other examples the contact pads may be arranged in a different order.

Data contact pad 510 may be used to input serial data to die 500 for selecting fluid actuation devices, memory bits, thermal sensors, configuration modes (e.g. via a configuration register), etc. Data contact pad 510 may also be used to output serial data from die 500 for reading memory bits, configuration modes, status information (e.g., via a status register), etc. Clock contact pad 512 may be used to input a clock signal to die 500 to shift serial data on data contact pad 510 into the die or to shift serial data out of the die to data contact pad 510. Logic power ground return contact pad 514 provides a ground return path for logic power (e.g., about 0 V) supplied to die 500. In one example, logic power ground return contact pad 514 is electrically coupled to the semiconductor (e.g., silicon) substrate 540 of die 500. Multipurpose input/output contact pad 516 may be used for analog sensing and/or digital test modes of die 500. In one example, multipurpose input/output contact (e.g., sense) pad 516 may provide sense interface 112 of FIGS. 1A and 1B or sense pad 212 of FIG. 2.

First high voltage power supply contact pad 518 and second high voltage power supply contact pad 524 may be used to supply high voltage (e.g., about 32 V) to die 500. First high voltage power ground return contact pad 520 and second high voltage power ground return contact pad 522 may be used to provide a power ground return (e.g., about 0 V) for the high voltage power supply. The high voltage power ground return contact pads 520 and 522 are not directly electrically connected to the semiconductor substrate 540 of die 500. The specific contact pad order with the high voltage power supply contact pads 518 and 524 and the high voltage power ground return contact pads 520 and 522 as the innermost contact pads may improve power delivery to die 500. Having the high voltage power ground return contact pads 520 and 522 at the bottom of the first column 502 and at the top of the second column 504, respectively, may improve reliability for manufacturing and may improve ink shorts protection.

Logic reset contact pad 526 may be used as a logic reset input to control the operating state of die 500. Logic power supply contact pad 528 may be used to supply logic power (e.g., between about 1.8 V and 15 V, such as 5.6 V) to die 500. Mode contact pad 530 may be used as a logic input to control access to enable/disable configuration modes (i.e., functional modes) of die 500. Fire contact pad 532 may be used as a logic input to latch loaded data from data contact pad 510 and to enable fluid actuation devices or memory elements of die 500.

Die 500 includes an elongate substrate 540 having a length 542 (along the Y axis), a thickness 544 (along the Z axis), and a width 546 (along the X axis). In one example, the length 542 is at least twenty times the width 546. The width 546 may be 1 mm or less and the thickness 544 may be less than 500 microns. The fluid actuation devices 508 (e.g., fluid actuation logic) and contact pads 510-532 are provided on the elongate substrate 540 and are arranged along the length 542 of the elongate substrate. Fluid actuation devices 508 have a swath length 552 less than the length 542 of the elongate substrate 540. In one example, the swath length 552 is at least 1.2 cm. The contact pads 510-532 may be electrically coupled to the fluid actuation logic. The first column 502 of contact pads may be arranged near a first longitudinal end 548 of the elongate substrate 540. The second column 504 of contact pads may be arranged near a second longitudinal end 550 of the elongate substrate 540 opposite to the first longitudinal end 548.

As illustrated in FIG. 5B, die 500 may include a strain gauge sensor (e.g., $102_0$ and/or $102_1$) arranged proximate the plurality of contact pads 510-532. Alternatively, or in addition, die 500 may include a strain gauge sensor (e.g., $102_2$ and/or $102_3$) arranged proximate the plurality of nozzles 508. In one example, die 500 may include a first strain gauge sensor $102_0$ arranged proximate the first column 502 of contact pads and a second strain gauge sensor $102_1$ arranged proximate the second column 504 of contact pads. Alternatively, or in addition, die 500 may include a first strain gauge sensor $102_2$ arranged proximate a first end of the column 506 of fluid actuation devices 508 and a second strain gauge sensor $102_3$ arranged proximate a second end of the column 506 of fluid actuation devices 508 opposite to the first end. In other examples, the number of strain gauge sensors within die 500 and the locations of each strain gauge sensor within die 500 may vary.

Figure 6:
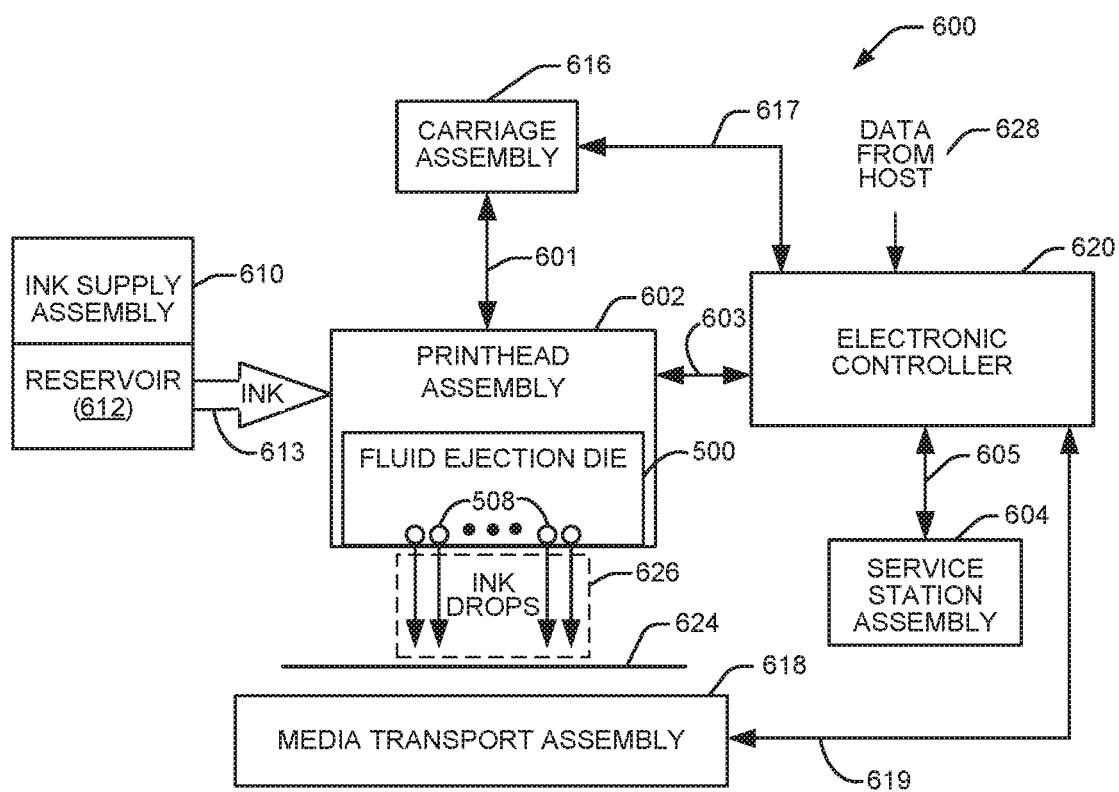
FIG. 6 is a block diagram illustrating one example of a fluid ejection system.

FIG. 6 is a block diagram illustrating one example of a fluid ejection system 600. Fluid ejection system 600 includes a fluid ejection assembly, such as printhead assembly 602, and a fluid supply assembly, such as ink supply assembly 610. In the illustrated example, fluid ejection system 600 also includes a service station assembly 604, a carriage assembly 616, a print media transport assembly 618, and an electronic controller 620. While the following description provides examples of systems and assemblies for fluid handling with regard to ink, the disclosed systems and assemblies are also applicable to the handling of fluids other than ink.

Printhead assembly 602 includes at least one printhead or fluid ejection die 500 previously described and illustrated with reference to FIGS. 5A and 5B, which ejects drops of ink or fluid through a plurality of orifices or nozzles 508. In one example, the drops are directed toward a medium, such as print media 624, so as to print onto print media 624. In one example, print media 624 includes any type of suitable sheet material, such as paper, card stock, transparencies, Mylar, fabric, and the like. In another example, print media 624 includes media for three-dimensional (3D) printing, such as a powder bed, or media for bioprinting and/or drug discovery testing, such as a reservoir or container. In one example, nozzles 508 are arranged in at least one column or array such that properly sequenced ejection of ink from nozzles 508 causes characters, symbols, and/or other graphics or images to be printed upon print media 624 as printhead assembly 602 and print media 624 are moved relative to each other.

Fluid ejection die 500 also includes one (i.e., a single) strain gauge sensor or a plurality of strain gauge sensors as previously described with reference to FIGS. 5A and 5B. The strain gauge sensors sense strain within fluid ejection die 500. In one example, the strain gauge sensors sense strain within fluid ejection die 500 during servicing of fluid ejection die 500 by service station assembly 604. In another example, the strain gauge sensors sense strain within fluid ejection die 500 during operation (e.g., printing) of fluid ejection system 600. In another example, the strain gauge sensors sense strain within fluid ejection die 500 over time during the life of fluid ejection die 500.

Ink supply assembly 610 supplies ink to printhead assembly 602 and includes a reservoir 612 for storing ink. As such, in one example, ink flows from reservoir 612 to printhead assembly 602. In one example, printhead assembly 602 and ink supply assembly 610 are housed together in an inkjet or fluid-jet print cartridge or pen. In another example, ink supply assembly 610 is separate from printhead assembly 602 and supplies ink to printhead assembly 602 through an interface connection 613, such as a supply tube and/or valve.

Carriage assembly 616 positions printhead assembly 602 relative to print media transport assembly 618, and print media transport assembly 618 positions print media 624 relative to printhead assembly 602. Thus, a print zone 626 is defined adjacent to nozzles 508 in an area between printhead assembly 602 and print media 624. In one example, printhead assembly 602 is a scanning type printhead assembly such that carriage assembly 616 moves printhead assembly 602 relative to print media transport assembly 618. In another example, printhead assembly 602 is a non-scanning type printhead assembly such that carriage assembly 616 fixes printhead assembly 602 at a prescribed position relative to print media transport assembly 618.

Service station assembly 604 provides for spitting, wiping, capping, and/or priming of printhead assembly 602 to maintain the functionality of printhead assembly 602 and, more specifically, nozzles 508. For example, service station assembly 604 may include a rubber blade or wiper which is periodically passed over printhead assembly 602 to wipe and clean nozzles 508 of excess ink. In addition, service station assembly 604 may include a cap that covers printhead assembly 602 to protect nozzles 508 from drying out during periods of non-use. In addition, service station assembly 604 may include a spittoon into which printhead assembly 602 ejects ink during spits to ensure that reservoir 612 maintains an appropriate level of pressure and fluidity, and to ensure that nozzles 508 do not clog or weep. Functions of service station assembly 604 may include relative motion between service station assembly 604 and printhead assembly 602.

Electronic controller 620 communicates with printhead assembly 602 through a communication path 603, service station assembly 604 through a communication path 605, carriage assembly 616 through a communication path 617, and print media transport assembly 618 through a communication path 619. In one example, when printhead assembly 602 is mounted in carriage assembly 616, electronic controller 620 and printhead assembly 602 may communicate via carriage assembly 616 through a communication path 601. Electronic controller 620 may also communicate with ink supply assembly 610 such that, in one implementation, a new (or used) ink supply may be detected.

Electronic controller 620 receives data 628 from a host system, such as a computer, and may include memory for temporarily storing data 628. Data 628 may be sent to fluid ejection system 600 along an electronic, infrared, optical or other information transfer path. Data 628 represent, for example, a document and/or file to be printed. As such, data 628 form a print job for fluid ejection system 600 and includes at least one print job command and/or command parameter.

In one example, electronic controller 620 provides control of printhead assembly 602 including timing control for ejection of ink drops from nozzles 508. As such, electronic controller 620 defines a pattern of ejected ink drops which form characters, symbols, and/or other graphics or images on print media 624. Timing control and, therefore, the pattern of ejected ink drops, is determined by the print job commands and/or command parameters. In one example, logic and drive circuitry forming a portion of electronic controller 620 is located on printhead assembly 602. In another example, logic and drive circuitry forming a portion of electronic controller 620 is located off printhead assembly 602.

Electronic controller 620 also receives the sensed strain response from each of the plurality of strain gauge sensors of fluid ejection die 500 during servicing of fluid ejection die 500 during which a servicing component (e.g., wiper) comes into contact with fluid ejection die 500. In one example, electronic controller 620 calibrates the servicing component of service station assembly 604 in response to the sensed strain response from each of the plurality of strain gauge sensors. In another example, electronic controller 620 provides data to a user of fluid ejection system 600 for manual calibration of service station assembly 604 by the user in response to the sensed strain response from each of the plurality of strain gauge sensors.

By monitoring the output of the strain gauge sensors during servicing, electronic controller 620 may determine whether components of service station assembly 604 are appropriately adjusted. If components of service station assembly 604 are found to not be appropriately adjusted, electronic controller 620 may take appropriate actions to address the issue. Too little pressure may result in ineffective servicing of fluid ejection die 500 while too much pressure may damage fluid ejection die 500 and/or force air into nozzles 508, which creates additional problems. In addition, the output of the strain gauge sensors may be monitored to determine if the pressure is too low at one end of fluid ejection die 500 while too high at the other end of fluid ejection die 500. In this case, a tilt adjustment of components of service station assembly 604 may be made to appropriately adjust the pressures on both ends of fluid ejection die 500. Based on the output of the strain gauge sensors, electronic controller 620 may alert a user of fluid ejection system 600 that there is a problem, adjust components of service station assembly 604, and/or stop servicing of fluid ejection die 500.

In one example, electronic controller 620 may also receive the sensed strain response from each of the plurality of strain gauge sensors during operation of the fluid ejection die 500. By monitoring the output of the strain gauge sensors during operation of fluid ejection die 500, electronic controller 620 can determine if fluid ejection die 500 comes into contact with the print media or some other object (i.e., a crash) and then take appropriate actions to address the issue. The actions may include alerting the user of fluid ejection system 600 that there is a problem or stopping operation of fluid ejection system 600.

In another example, electronic controller 620 may also receive the sensed strain response from each of the plurality of strain gauge sensors to monitor vibrations of fluid ejection die 500. The vibrations may be due to sources external to fluid ejection system 600 (e.g., fluid ejection system 600 being moved while operating or placed in a mobile environment) or may be due to sources internal to fluid ejection system 600 (e.g., worn or defective rollers and/or motors). By monitoring the output of the strain gauge sensors, electronic controller 620 can take appropriate actions in response to detecting vibration. For larger fluid ejection systems 600, these actions may include alerting the user that there is a part approaching its end of life. For smaller (e.g., more mobile) fluid ejection systems 600, these actions may include alerting the user that the vibrations are too strong to allow the fluid ejection system to operate effectively or that the fluid ejection system is in an inappropriate orientation.

In another example, electronic controller 620 may also receive the sensed strain response from each of the plurality of strain gauge sensors to monitor the strain over time to which the fluid ejection die 500 is subjected. The measured strain response may be related to ambient factors (i.e., the fluid ejection system's external environment) such as temperature cycling that leads to a cracked die failure. The measured strain response may also be related to conditions created by the fluid ejection die 500 itself, such as rapid temperature change due to firing nozzles that stress the die and headland interfaces (i.e., the interfaces between fluid ejection die 500 and printhead assembly 602) hundreds of thousands of times over the life of the fluid ejection die. It is known that over time ink soaks into structural adhesives in the headland causing swelling that increases stress to the die joints. This results in increasing warpage of the printhead assembly headland. By monitoring the output of the strain gauges over time, and after establishing known safe limits of strain for the die, electronic controller 620 can determine if the fluid ejection die 500 is trending toward near-term failure, and then take appropriate actions to address the issue. These actions may include alerting the user of fluid ejection system 600 that there is a fluid ejection die approaching wear out or stopping operation of fluid ejection system 600.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An integrated circuit to drive a plurality of fluid actuation devices, the integrated circuit comprising:
 a strain gauge sensor to generate a strain gauge signal;
 an amplifier to amplify the strain gauge signal;
 a voltage bias generator to offset the amplified strain gauge signal; and a sensor coupled at a downstream side of the amplifier, the sensor to detect a state of the integrated circuit associated with the strain gauge signal.

2. The integrated circuit of claim 1, further comprising:
a plurality of strain gauge sensors; and
control logic to selectively electrically couple each of the plurality of strain gauge sensors to the amplifier.

3. The integrated circuit of claim 1, further comprising:
a configuration register storing data to set a bias magnitude of the voltage bias generator.

4. The integrated circuit of claim 1, further comprising:
a configuration register storing data to set a gain of the amplifier.

5. The integrated circuit of claim 1, further comprising:
a configuration register storing data to enable or disable the strain gauge sensor.

6. The integrated circuit of claim 1, further comprising:
a single interface to output the offset and amplified strain gauge signal.

7. The integrated circuit of claim 6, wherein the single interface comprises a contact pad, a pin, a bump, or a wire.

8. The integrated circuit of claim 6, wherein the single interface is to contact a single printer-side contact to transmit signals to and from the single printer-side contact.

9. The integrated circuit of claim 6, further comprising:
at least one of a thermal sensor coupled to the single interface, a crack detector coupled to the single interface, and a plurality of memory cells coupled to the single interface.

10. The integrated circuit of claim 1, wherein the strain gauge sensor comprises a half wheatstone strain gauge sensor.

11. An integrated circuit comprising:
an elongate substrate having a length, a thickness, and a width, the length being at least twenty times the width, wherein on the elongate substrate there is provided:
  a plurality of nozzles arranged in a column along the length of the elongate substrate;
  a plurality of contact pads arranged along the length of the elongate substrate;
  a first strain gauge sensor to generate a first strain gauge signal;
  an amplifier to amplify the first strain gauge signal;
  a voltage bias generator to offset the amplified first strain gauge signal, and
  a sensor coupled at a downstream side of the amplifier, the sensor to detect a state of the integrated circuit associated with the first strain gauge signal,
  wherein the amplified and offset first strain gauge signal is output to one of the plurality of contact pads.

12. The integrated circuit of claim 11, wherein the first strain gauge sensor is arranged proximate the plurality of contact pads.

13. The integrated circuit of claim 11, wherein the first strain gauge sensor is arranged proximate the plurality of nozzles.

14. The integrated circuit of claim 11, wherein the contact pads comprise first contact pads at a first longitudinal end of the elongate substrate and second contact pads at a second longitudinal end of the elongate substrate opposite to the first longitudinal end, and
wherein the plurality of nozzles are between the first contact pads and the second contact pads, and
wherein on the elongate substrate there is further provided:
  a second strain gauge sensor arranged proximate the second contact pads, the second strain gauge sensor to generate a second strain gauge signal,
  wherein the amplifier is to amplify the second strain gauge signal,
  wherein the voltage bias generator is to offset the amplified second strain gauge signal, and
  wherein the first strain gauge sensor is arranged proximate the first contact pads.

15. The integrated circuit of claim 11, wherein on the elongate substrate there is further provided:
a second strain gauge sensor arranged proximate a first end of the column, the second strain gauge sensor to generate a second strain gauge signal,
wherein the amplifier is to amplify the second strain gauge signal,
wherein the voltage bias generator is to offset the amplified second strain gauge signal, and
wherein the first strain gauge sensor is arranged proximate a second end of the column opposite the first end.

* * * * *